May 9, 1944.   J D BUCHANAN ET AL   2,348,189
VIBRATION TESTING DEVICE
Filed May 26, 1942   2 Sheets-Sheet 1

INVENTORS
PAUL W. ADLER,
BY J. D. BUCHANAN,
W. E. Beatty
ATTORNEY.

May 9, 1944.  J D BUCHANAN ET AL  2,348,189
VIBRATION TESTING DEVICE
Filed May 26, 1942   2 Sheets-Sheet 2
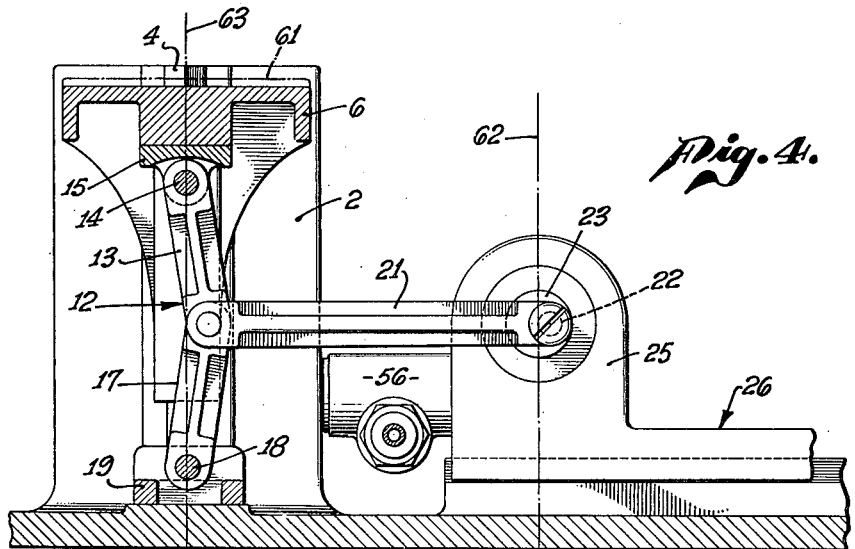
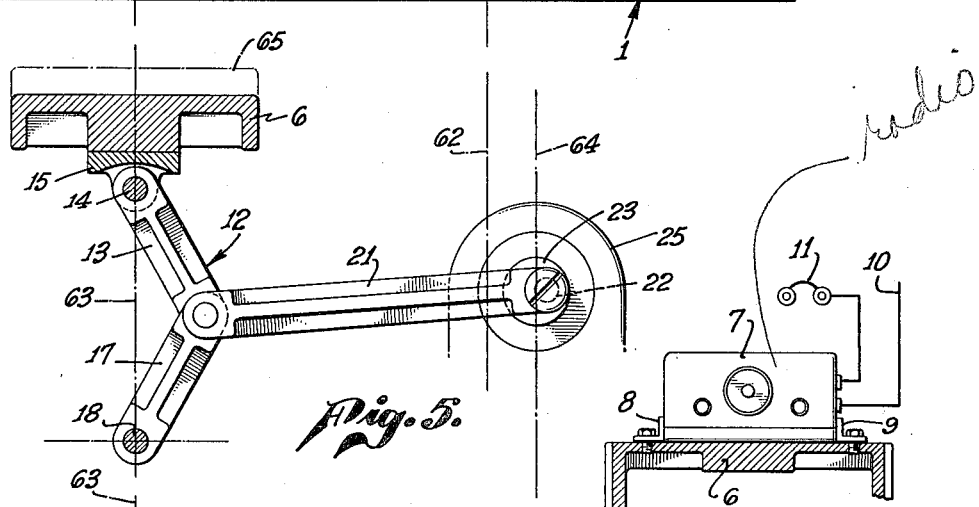
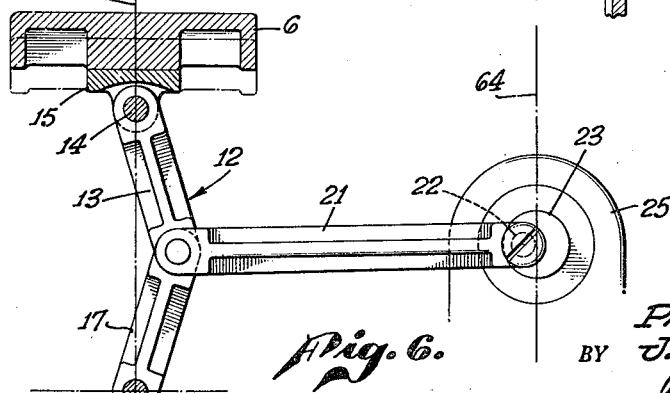
INVENTORS
PAUL W. ADLER,
BY  J. D. BUCHANAN,
W E Beatty
ATTORNEY.

UNITED STATES PATENT OFFICE 2,348,189

VIBRATION TESTING DEVICE

J D. Buchanan and Paul W. Adler, Burbank, Calif.

Application May 26, 1942, Serial No. 444,598

5 Claims. (Cl. 73—51)

The invention relates to a vibration testing device and particularly to apparatus for testing the operation of a piece of apparatus such as a relay or radio set, under vibratory conditions, in order to determine whether the apparatus can withstand the vibration encountered in actual practice. For example, it may be desired to determine whether a relay or radio set will withstand the vibration encountered in an aircraft.

According to the invention, means is provided for vibrating at different speeds the apparatus to be tested, and for varying the excursion of vibration with precision, whereby the excursion of vibration may be accurately adjusted to meet the test requirements with precision, either to simulate the vibration encountered under working conditions, or the vibration may be made more or less severe than that encountered under such working conditions.

The force with which a vibrating support is reciprocated depends on its excursion and also on its speed. These variables must be changed in opposite respects if the force is to be constant, that is if the test is to be made at the same force but at a higher speed, the excursion must be reduced, and the converse is true. Certain test conditions require that the test piece be vibrated step by step over a wide range of speed such as from 10 c. p. s. to 60 c. p. s. but at the same force such as 10 g. An object of the invention is to provide for accurately resetting the amount of excursion for each different speed, and particularly to do this while the apparatus is being vibrated, to avoid the necessity of stopping the apparatus for re-adjustment.

For further details of the invention, reference may be made to the drawings, wherein Fig. 1 is a plan view partly in section of a vibration testing device adapted to be operated in accordance with the method disclosed.

Fig. 4 is an enlarged vertical sectional view with parts broken away, and illustrating the device adjusted for a small extent of vibration.

Fig. 5 is an enlarged vertical sectional view with parts broken away, showing the device adjusted for a larger amount of vibration and illustrating the vibrating support at the bottom of its travel.

Fig. 6 is a view corresponding to Fig. 5, but with the parts in a different relative position and illustrating the vibrating support at the top of its travel.

Fig. 7 is a vertical sectional view through the vibrating support of the other figures, illustrating schematically a typical test piece such as a radio set mounted thereon.

Figure 1:
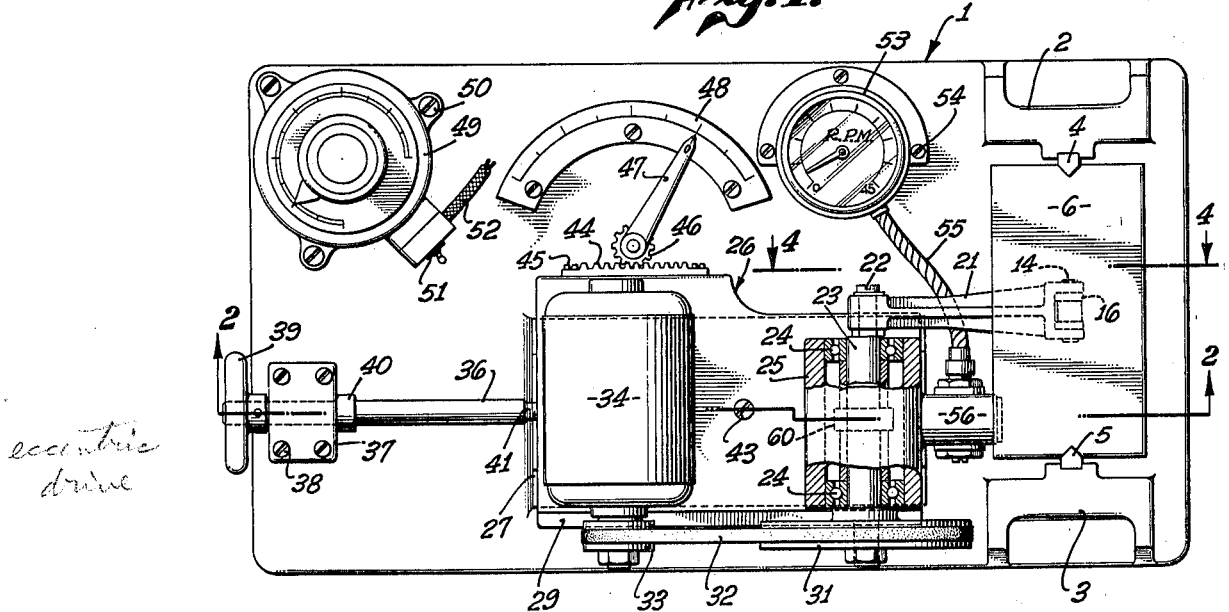

Referring in detail to the drawings, there is provided a rectangular base 1 of metal, having cast integral therewith two posts or columns 2 and 3 which arise from the base 1, which are substantially U shaped as shown, and the opposite faces of which are provided with V parallel slide bearings 4 and 5 on which is slidably mounted a rectangular vibratory platform 6 adapted to support the test piece. As indicated in Fig. 7, a test piece such as a radio set 7 may be secured to the platform 6 by any suitable means such as brackets 8 and 9. The radio set if desired, may be provided with a line 10 to connect it to a source of electrical power, and with a head-set 11 so that the operation of the radio set 7 may be observed while it is being vibrated by the platform 6 or, the radio set 7 may be checked after it has been subjected to vibration.

Figure 2:
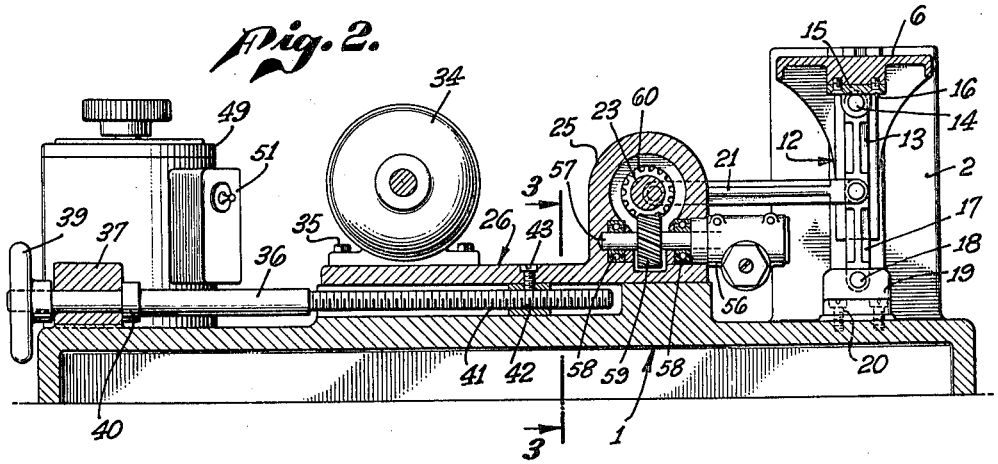
Fig. 2 is a vertical sectional view on line 2—2 of Fig. 1, looking in the direction of the arrows.
Figure 3:
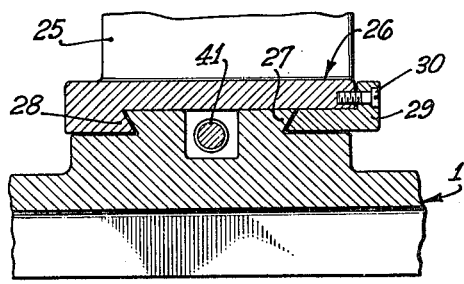
Fig. 3 is an enlarged sectional view on line 3—3 of Fig. 2, looking in the direction of the arrows and with parts broken away.

Referring to Figs. 1 and 2, the platform 6 is vibrated by means of a toggle 12, one link 13 of which is pivotally connected to a pin 14 mounted in a block 15 suitably secured to the underside of platform 6 by means such as screws 16. The outer end of link 17 of toggle 12 is pivotally connected to a pin 18 carried by block 19 suitably secured to the base 1 by means such as screws 20. The adjoining ends of links 13 and 17 are pivotally connected to one end of a pitman 21, the other end of which is connected to an eccentric 22 on a shaft 23 mounted in bearings such as 24 carried by a bearing housing 25 which may be cast integral with a slide 26. As shown in Fig. 3, the base 1 is provided with a dovetail 27 which is slidably engaged by a dovetail 28 on the slide 26. One side of the dovetail 28 is made removable as indicated at 29, being held in position by a screw 30, so that the slide 26 may be removed from base 1, and mounted thereon as desired. One end of shaft 23 as shown in Fig. 1, is provided with a pulley 31 driven by belt 32 from pulley 33 on electric motor 34 mounted on slide 26 and secured thereto by means such as bolts 35.

The slide 26 is moved along the dovetails 27, 28 on base 1 by means of a screw 36 which is mounted for rotation, without longitudinal movement, in the bearing block 37 secured to base 1 by screws 38. The hand wheel 39 on the screw 36 bears against the left side of bearing 37 and prevents the screw 36 from moving to the right, while the collar 40 on screw 36 bears against the right end of bearing 37 and prevents the screw 36 from moving to the left. The screw 36 is provided with a screw-threaded portion 41 which extends under the center of slide 26 into engagement with the nut 42 secured to slide 26 by screw 43. Thus by turning the hand wheel 39 one way or the other, the slide 26 may be advanced or retracted, to thereby vary the effective length of the pitman 21 and the throw of the platform 6 as will be later described in connection with Figs. 4 to 6.

In order to indicate the position of slide 26 with reference to base 1, we provide a rack 44 secured to one side of slide 26 by means such as screws 45, the rack 44 meshing with a pinion 46 having secured thereto a pointer 47 cooperating with a scale 48 on the base 1. The scale 48 may be calibrated in terms of actual travel of the slide 26 with reference to the base 1, or preferably it is calibrated in terms of the amount of excursion of the platform 6.

The speed of the motor 34 may be varied, independently of the adjustment of the extent of travel of platform 6, as the movement of the slide 26 varies the throw of the platform 6 but does not vary the speed of the motor 34, while varying the speed of the motor 34 does not vary the throw of the platform 6. The speed of motor 34 may be varied by means of a rheostat 49 which may be mounted on base 1 by means of screws 50. The rheostat 49 may have a start switch 51 which is connected to electrical conductors such as 52, which have not been shown in full detail, connected to a suitable source of supply and to the motor 34.

In order to indicate the speed of operation of the support 6, there is provided a tachometer 53 mounted on base 1 by means of screws such as 54. Tachometer 53 is driven by a flexible drive 55 which does not interfere with the movement of slide 26. Tachometer 53 is coupled to a drive 56 mounted centrally at one side of the bearing housing 25, the drive 56 having a shaft 57 which is mounted in bearings 58 in the housing 25. The shaft 57 extends underneath and at right angles to the shaft 23, and has a spiral gear 59 meshing with a gear 60 on the shaft 23. Hence the tachometer 53 indicates the speed of shaft 23, and hence the speed of vibration of support 6.

Referring to Fig. 4, if the slide 26 is adjusted as shown to a position comparatively close to the toggle 12 so that when the eccentric 22 as indicated, has moved the pitman 21 to its extreme position to the right, and with the links 13 and 17 departing but slightly from a vertical position, then when the eccentric 22 is 180° from the position shown, with pitman 21 in its extreme position to the left, the toggle 12 will be straight and the support 6 will have been moved from the full line position shown, only a comparatively short distance as indicated by the dot-dash line 61. In Fig. 4, the center line of shaft 23 is indicated by the dot-dash line 62, and for purposes of comparison this line has been extended into Fig. 5. If now the slide 26 is moved to the right, farther from the center line 63 of toggle 12, with the center line 62 now taking the position indicated at 64, Fig. 5 illustrates the relative position of the parts when the pitman 21 is in its extreme position to the right and with the support 6 in its lower-most position, while the dot-dash line 65 indicates the upper-most position of slide 6, this position being shown in full lines in Fig. 6, when the eccentric 22 is 180° from the position shown in Fig. 5. It will be seen that the extent of travel of the platform 6 in Figs. 5 and 6 is much larger than its extent of travel when the slide 26 is adjusted as indicated in Fig. 4. Hence by operating the hand wheel 39, the extent of travel of the support 6 may be adjusted to a desired value, while the speed of motor 34 may be adjusted to any desired speed or speeds for that particular extent of vibration, and either or both of these adjustments may be made while motor 34 vibrates support 6. Also these two variables may be adjusted in opposite respects to cause support 6 to move with the same force at speeds which may be changed from time to time, while the apparatus is running.

The control of the extent of vibration of support 6 by means of handle 39, the control of the speed of motor 34 by rheostat 49, the indication of the position of slide 26 with reference to base 1 by means of indicator 47 and scale 48, (and thereby the extent of travel of support 6) and the indication of the speed of support 6 by the tachometer 53, all make it possible to select any desired test conditions, and duplicate them in a simple accurate manner. Loose play should of course be avoided in the drive from eccentric 22 to support 6 and in the rack 44 and pinion 46 for the pointer 47.

It will be apparent that various modifications may be made in the invention without departing from the spirit of the following claims. For example, the invention is not restricted to any particular kind of apparatus which is to be subjected to the vibration test.

We claim:

1. Vibration testing apparatus comprising the combination of a base, a bearing on said base, a vibratory support slidably mounted for vertical movement on said bearing, a toggle having one end thereof pivotally connected to said support and the other end pivotally connected to said base, a pitman connected to said toggle, a slide on said base, a shaft rotatably mounted on said slide and having an eccentric connected to said pitman, a motor mounted on said slide and connected to said shaft, means for varying the position of said slide on said base to vary the excursion of said support, and means operated by said slide for indicating the excursion of said support.

2. Vibration testing apparatus comprising the combination of a base, a bearing on said base, a vibratory support mounted on said bearing for vertical movement, a toggle connected at one end of said support and at the other end to said base, a pitman for said toggle, a slide having a dovetail connection with said base, a rotatable shaft on said slide and having an eccentric connected to said pitman, a motor on said slide connected to said shaft, a nut fixed to said slide, a screw rotatably mounted on said base and having threaded engagement with said nut, a tachometer drive connected to said shaft, a tachometer on said base, a flexible coupling from said drive to said tachometer, a scale on said base, an indicator for said scale, and means for operating said indicator in accordance with the movement of said slide.

3. Vibratory apparatus comprising the combination of a base, a slide bearing on said base, a vibratory support slidable on said bearing, a toggle having one end thereof pivotally connected to said support and the other end thereof pivotally connected to said base, a pitman connected to said toggle, an eccentric drive connected to said pitman, means for varying the position of said eccentric drive with respect to the center line of said toggle to vary the excursion of said support, means for varying the speed of said eccentric drive, an excursion indicator for said drive, and a speed indicator for said drive.

4. Vibration testing apparatus comprising the combination of a horizontal base, spaced slide bearings arising from said base, a vibratory support slidably mounted for vertical movement on said bearings, a toggle having one end thereof pivotally connected to said support and the other end thereof pivotally connected to said base, a pitman connected to said toggle, a slide arranged for horizontal movement on said base toward and away from said toggle, a shaft rotatably mounted on said slide and having an eccentric connected to said pitman, means for rotating said shaft, and means for varying the position of said slide on said base to vary the excursion of said support.

5. Vibration testing apparatus according to claim 4 comprising excursion indicating means operable in accordance with the movement of said slide.

J D. BUCHANAN.
PAUL W. ADLER.